United States Patent [19]

Gerbault et al.

[11] 4,058,987
[45] Nov. 22, 1977

[54] METHOD AND DEVICE FOR CONNECTING SUB-MARINE PIPELINES TO A WEIGHT PLATFORM

[75] Inventors: Marcel Gerbault, Paris, France; Robert Gair, London, England

[73] Assignees: Sea Tank Co. S.A., Chevilly Larue, France; Oceanic Contractors Inc., Panama City, Panama

[21] Appl. No.: 656,273

[22] Filed: Feb. 9, 1976

[30] Foreign Application Priority Data

Feb. 14, 1975 France .................. 75.04661

[51] Int. Cl.² .................. F16L 1/04; E02D 27/38
[52] U.S. Cl. .................. 61/86
[58] Field of Search .......... 61/46.5, 72.3, 72.1, 72.4, 61/46; 166/.5, .6; 277/30, 34.3

[56] References Cited

U.S. PATENT DOCUMENTS

| | | | |
|---|---|---|---|
| 2,442,622 | 6/1948 | Starr | 277/30 |
| 2,775,869 | 1/1957 | Pointer | 277/34.3 X |
| 2,815,966 | 10/1957 | House | 277/34.3 |
| 3,136,133 | 6/1964 | Perret | 61/72.3 |
| 3,179,423 | 4/1965 | McCloud | 277/30 |
| 3,482,410 | 12/1969 | Roesky et al. | 166/.5 X |
| 3,585,805 | 6/1971 | Vincent | 61/72.3 |
| 3,614,869 | 10/1971 | Flory et al. | 61/46 |
| 3,886,753 | 6/1975 | Birdy et al. | 61/46.5 |
| 3,938,343 | 2/1976 | Lamy | 61/46.5 |
| 4,009,584 | 3/1977 | Lamy | 61/86 |

*Primary Examiner*—Dennis L. Taylor
*Attorney, Agent, or Firm*—Stevens, Davis, Miller & Mosher

[57] ABSTRACT

Method and device for connecting submarine pipelines to a marine platform resting by its weight on the sea bed and called a weight-platform, whose object is to dispense with the intervention of frog-men which was necessary up till now to make such connections. The essential feature of the invention consists in inserting each pipeline to be connected in the base of the platform through a cavity whose dimensions are determined so as to enable both the installing of the fluid-tight sealing means necessary for the connecting operation and the free play of the pipeline during operation. That method and device are applicable to all marine oil fields to ensure the reliability of the connections and the reducing of the dangers of pollution.

8 Claims, 8 Drawing Figures

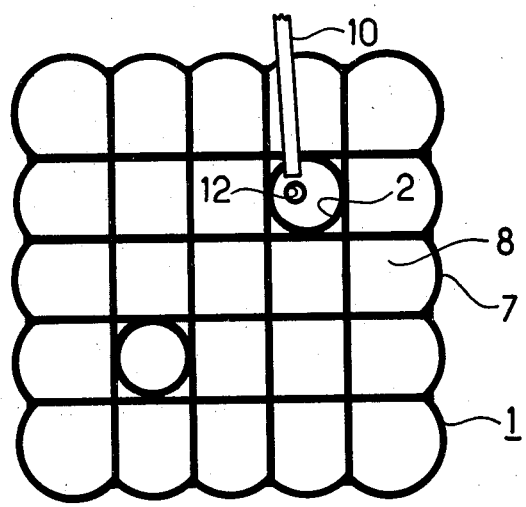
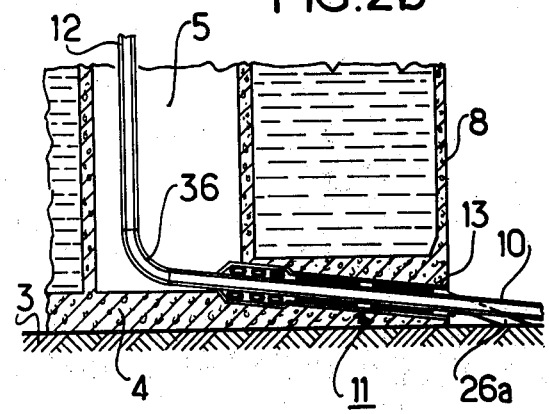
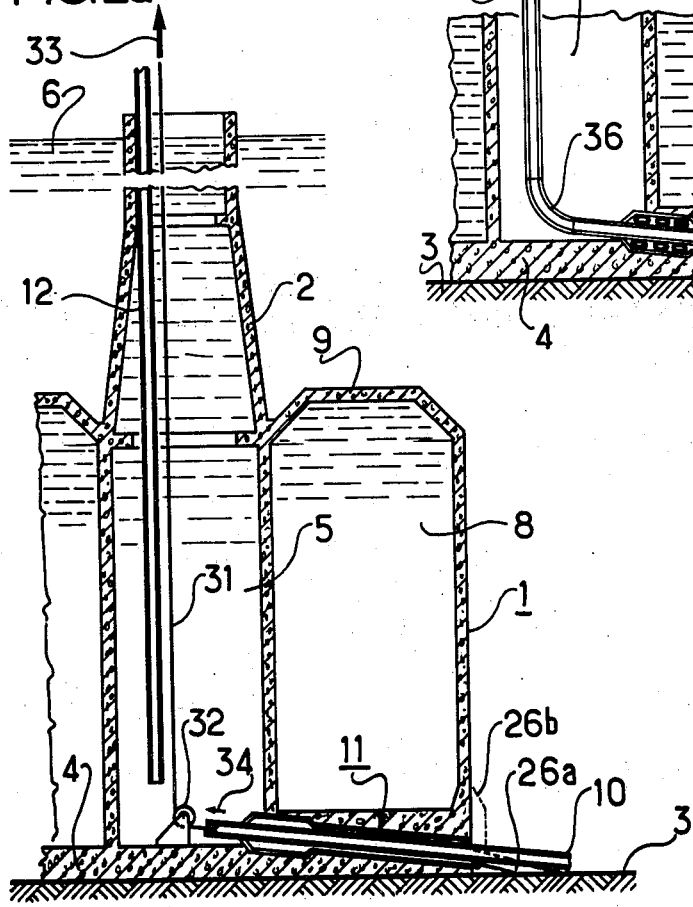

METHOD AND DEVICE FOR CONNECTING SUB-MARINE PIPELINES TO A WEIGHT PLATFORM

The present invention concerns a method for connecting sub-marine pipelines to a weight-platform comprising a hollow concrete base which can be used as a tank and resting, by means of its rast, on the sea bed by its own weight and above which is installed at least one hollow column communicating with the said base and supporting the actual emerging platform: it relates to both a method of joining by welding of the sub-marine pipelines which have vertical pipes connected to the platform thus avoiding hyperbaric welds, and a use of the circuits of fluide thus obtained without stress, that is, allowing their relative movement with respect to the weight-platform.

Indeed, it is known how to form the connection between a sub-marine pipeline and a weight platform by making the concrete extend beyond the rast of the latter in which it has been sunk, a tube communicating with the vertical pipes connected to the emerging platform: the connecting of the sub-marine pipeline with the tube is then effected by welding. Welder-divers then form, in a suitable bell, a hyperbaric weld, and the cost price of such an operation is very expensive.

To avoid such an operation, it has been proposed to effect the welding operation at atmospheric pressure. For that purpose, it has been proposed to sink previously into the rast a tube forming a sheath and through which is inserted the sub-marine pipeline, once it has been submerged. After having ensured, by means of inflatable seal rings, the fluid-tight sealing between the said pipeline and the said sheath, the water is drained from the cell of the base into which the end of the said pipeline leads, and the welding with the vertical pipe connected to the platform is then affected in good conditions at atmospheric pressure; then, a suitable mortar is injected into the space comprised between the sub-marine pipeline and the sheath through which it has been pulled to make it integral with the structure. The pipeline then follows all the periodic movements imposed on the structure by the swell and it then undergoes stresses and fatigue which are enough to reduce its service life appreciably. There result therefrom dangers of pollution in "offshore" oil fields and it is hence necessary to reduce that pollution to acceptable proportions. The object of the present invention consiste in providing a sufficient play between the pipeline and the tunnel through which it is inserted up to the level of the column containing the vertical pipe to which it is connected, so that after welding, the free play of said pipeline inside said tunnel be ensured, whereas the contingent movements of said pipeline along its axis are allowed by the flexibility of the circuit of fluid which it forms with said vertical pipe to which it is connected.

One of the important characteristics of the method according to the invention consists in the introducing of each pipeline through a cavity in the base of the weight-platform up to the base of the column containing the pipes connected to the platform, the dimensions of said cavity allowing the use of fluid-tight sealing means between said cavity and the said pipeline thus enabling the draining of the water from said column to effect, in the open air, the welding of said pipeline to the corresponding pipe, and allowing, after breakage of said fluid-tight sealing, the free play of said pipeline.

The aim, the other characteristics and advantages of the present method will become apparent from the following description of a device, having no limiting character, for implementing said method in connection with the accompanying drawing, in which:

FIG. 1 and 2*a* show part diagrammatic views, respectively of a plan and of a vertical cross-section of a weight-platform in whose rast a sub-marine pipeline has been inserted.

FIG. 2*b* shows a part vertical cross-section view of the weight-platform according to FIG. 2*a* after the welding of the sub-marine pipeline to a vertical pipe.

Figure 5A:
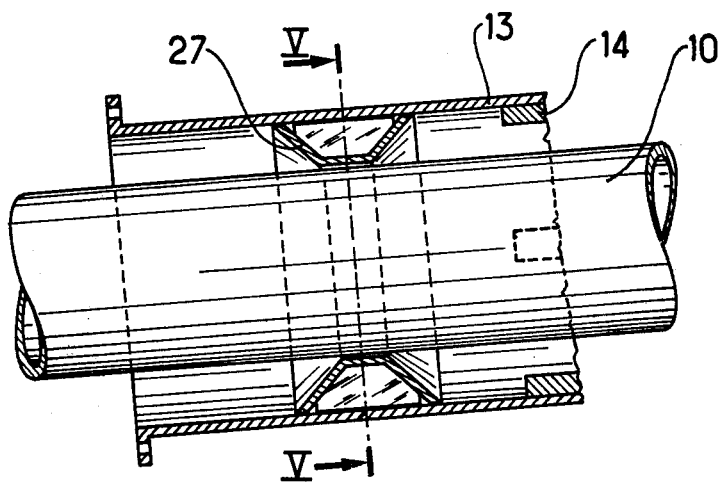
Figure 5B:
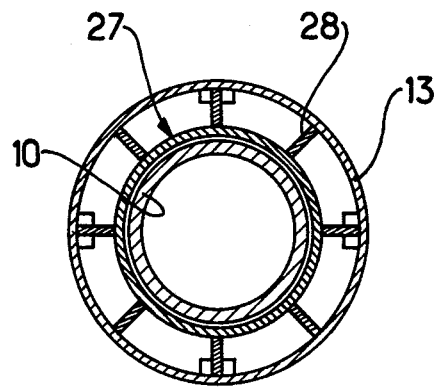

FIG. 5*a* and 5*b* show part cross-section views, respectively axial and transversal, of the guiding device for the pepeline at the end of the tunnel on the external side.

Figure 3:
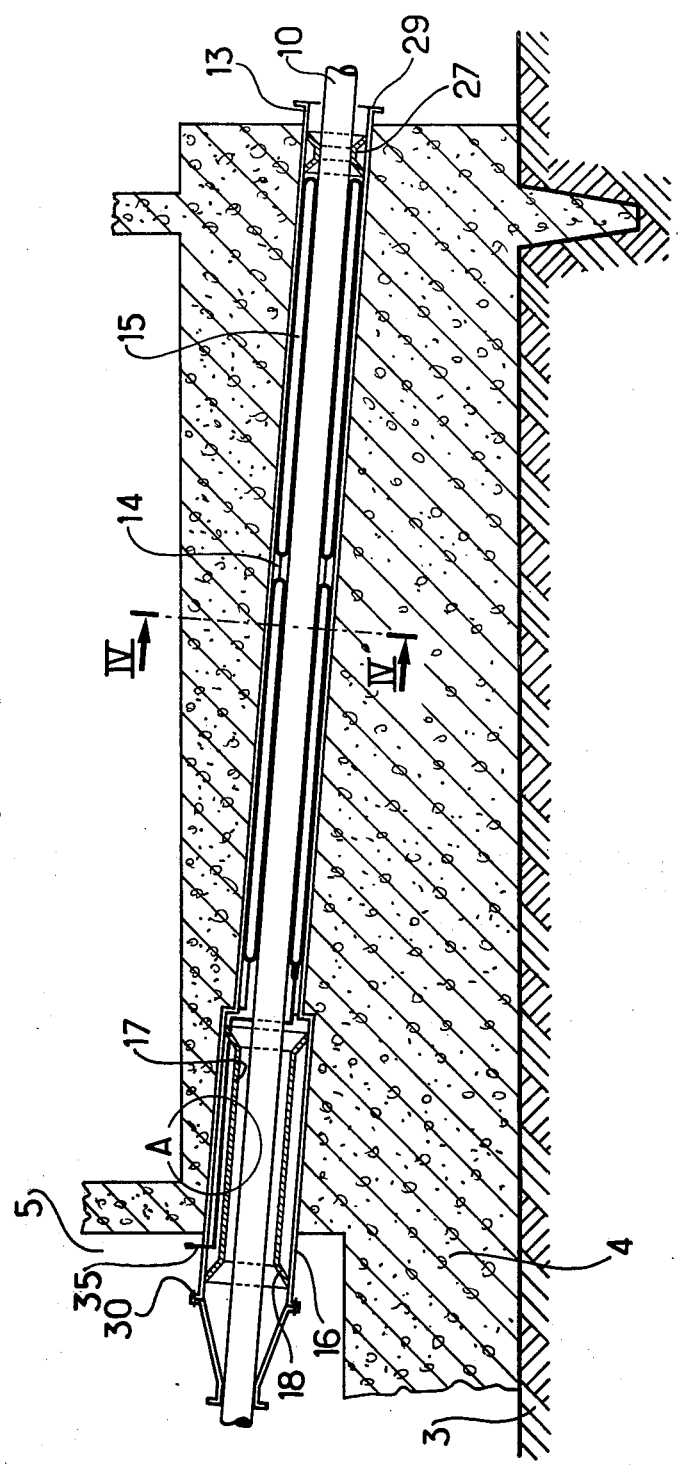
FIG. 3 is an enlarged part cross-section view of the portion of rast comprising the tunnel, provided with the device having fluid-tight sealing means, after insertion of the pipeline.
Figure 6:
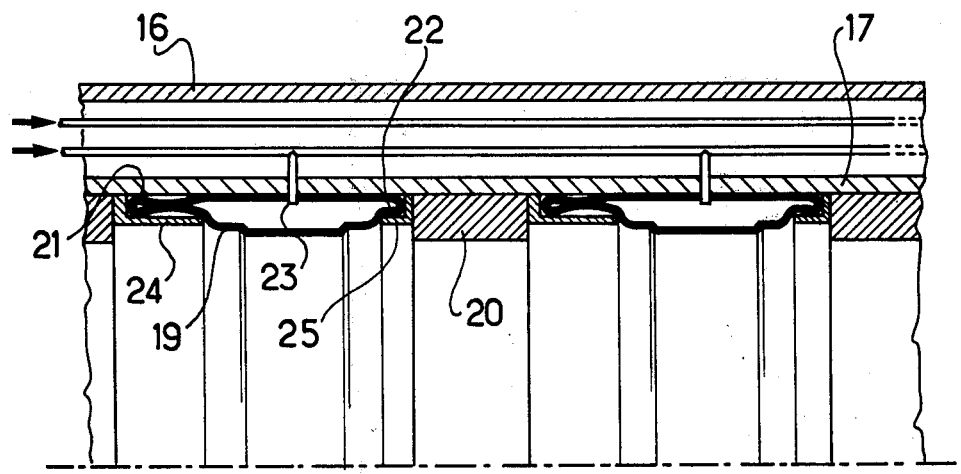

FIG. 6 is an enlarged part cross-section view of the portion A in FIG. 3, at the level of the fluid-tight sealing device.

In FIGS. 1, 2*a* and 2*b*, the weight-platform comprises a base 1, two emerging columns 2 on which the actual platform, not shown, rests. The multicellular base 1 rests on the sea bed 3 by means of the rast 4. Each of the columns 2 rests on one of the inside calls 5 of the base with which they communicate, whereas their upper part emerges sufficiently above the level of the water for the platform which they support to be shelterred from the effects of the swell. The base 1 is designed to withstand the hydraulic pressure to which it is subjected during its immersion; moreover, the sides 7 of the peripheral cells 8 subjected to the pressure of the water outside are curved; this is also the case with the truncated cone shaped roof portions 9, so that each cell has a polyhedral convex shape in its portions in contact with the water outside. The sub-marine pipeline 10 cross through a tunnel 11 formed in the rast 4 to be connected to the vertical pipe 12 connected to the platform.

Figure 4:
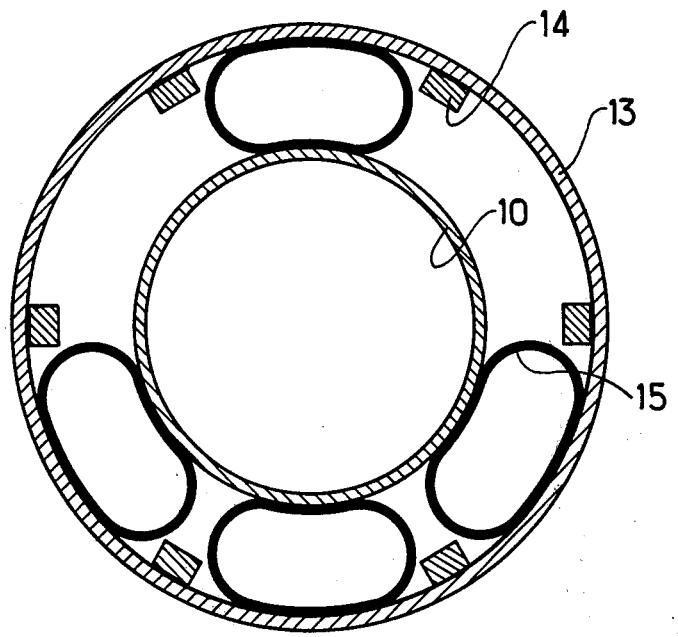
FIG. 4 shows the following cross-section view through IV-IV in FIG. 3, at the level of the centering casings.

The tunnel 11, FIGS. 3 and 4, is constituted by a metallic tube 13 having an inside diameter greater than that of the pipeline 10 and is provided, throughout its length, with longitudinal metallic guide chocks 14, between which there are inflatable casings 15, for which they provide protection during the period in which the pipeline 10 is inserted. Once the pipeline 10 is in place, the casings 15, suitably arranged in the metal tube 13, enable the centering of said pipeline 10 in the latter. On the internal side of the base 1, the tunnel 11 widens out into a cylindrical tube 16 leading into the cell 5.

A tube 17 is inserted in the tube 16, in which it is centered by its tapered conical ends 18 which are welded in a fluid-tight manner on the said tube 16.

In FIG. 6, inflatable annular seals 19 are installed in the tube 17 and separated from one another by metal rings 20 ensuring their protection during the operation for the inserting of the pipeline 10. Each seal 19 is provided with assymetrical flanges 21 and 22 which can move, during their phase of inflation by the tube 23, in the respective metal parts 24 and 25, and during their deformation are intended to ensure fluid-tight sealing between the pipeline 10 and the tube 17.

On the outside of the base 1 (FIG. 2a) a converging ramp 26a fitted with rollers, intended to facilitate the guiding of the pipeline 10 when it is pulled towards the tunnel 11 is installed at the input of the latter where the said pipeline (see FIG. 3), then goes through an annular guiding part 27 arranged in the metal tube 13 of the tunnel 11 just in front of the longitudinal chocks 14. The part 27 is centered, in FIGS. 5a and 5b, in the tube 13 by its tapered ends, whose rigidity is ensured by radial strengthening parts 28.

The tunnel 11 is sunk in the rast 4 during the casting of the said rast of the weight-platform, and provided with removable fluid-tight caps (not shown) which are fixed at its two respective ends 29 and 30 to ensure the closing thereof during the constructing and towing and until its immersion at the final site.

The progress of the process of connecting the pipeling 10 to the pipe 12 is conducted in a sequence of five main phases: opening of the tunnel, pulling of the pipeline through the tunnel, effecting of the fluid-tight sealing of the tunnel and draining of the water retained in the isolated portion, welding in the open air, after which the fluid-tight sealing is broken and the said isolated portion is again filled with water.

For the opening of the tunnel 11, the column 2 and the communicating cell 5 are filled with water, when the weight-platform has been immersed at the final site, to ensure the balance of pressures on either side of the tunnel to enable the opening and the removal of the two fluid-tight caps of the said tunnel 11. The ramp folded back in the position 26b, shown by a discontinuous line, in the figure, before the installing of the weight-platform, is then unfolded as at 26a.

For the pulling of the pipeline 10, a cable 31 goes down into the column 2 and the cell 5, bears against the pulley 32, passes through the tunnel 11 and is fixed on the end of the said pipeline 10, as soon as the latter is laid over a length of a hundred or so meters. The cable 31 is connected to a winch arranged on the platform and not shown; said winch drives said cable 31 and said pipeline 10 in movement in the directions shown by the respective arrows 33 and 34. When the pipeline 10 is inserted in the tunnel 11 up to the position shown in FIG. 2a, the pulling is stopped.

To obtain fluid-tight sealing, first, the pipeline 10 is centered in the tunnel 11 by inflation of the casings 15; then, water or oil is injected through the tubing 35 and the pipes 23 into the inflatable seals 19 which surround the pipeline 10, until perfect fluid-tight sealing between the latter and the tube 17 of the tunnel 11 is obtained. The inside and the outside of the cell 5 then no longer communicate and it becomes possible to drain the water contained in the column 2 and in the cell 5.

For the welding, welders can then go down through the column 2 into the cell 5 and weld the end of the pipeline 10 extending out of the tunnel 11, it also being empty, to the vertical pipe 12 by means of the elbow connection 36, as shown in FIG. 2b. When connecting is ended, the pipeline 10 is then ready for transporting either raw petreleum such as it comes from the well, or petroleum which has undergone a first treatment on the platform, or, even, gas at very high pressure both before and after having undergone a first treatment on the platform.

Nevertheless, to avoid stresses on the pipeline 10 under the effect of either movements imparted to the base 1 by swell or movements resulting from the flow in the said pipeline 10 of the fluid which it conveys, the cell 5 and the column 2 are filled with water again so as to have, inside, the same level as that of the water on the outside; then both the seals 19 and the casings 15 are deflated to release the pipeline 10 in the tunnel 11, and enable the free play of the said pipeline 10 without stress due to the choice of the diameter of the tubes 16 and 17. The diameter of the tube 17 is, indeed, determined wide enough to provide the necessary tolerance for the free play of the pipeline 10, but not too wide to allow, still, the effecting, by inflatable seals, of the required fluid-tight sealing for the welding to be effected.

An extra advantage of the method according to the invention is that it makes it possible to effect, if this proves to be necessary, the changing of the pipeline, effecting the following operational sequence: inflating of the seals and casings, draining of the column and of the subjacent cell, cutting of the pipeline in a dry condition, filling again of the column and of the cell connected therewith, deflating of the seals and of the casings, removal, of the said pipeline, and installing of a new pipeline according to the method which is the object of the invention.

It is self-evident that the present invention is not limited to the methods of embodiment of the device which have just been described, but that it comprises all the possible variations complying with the general definition which has been given thereof and that its scope is limited only by the claims herewith.

We claim:

1. A method for connecting a sub-marine pipeline to a riser pipe in a hollow concrete base of an offshore structure, said riser pipe extending along a substantially vertical hollow column and being connected to a work platform mounted on the base by means of one or more of said columns, the method comprising the steps of:
    inserting the pipeline into the base through a submerged passage communicating with the interior and exterior of the hollow base up to the foot of said hollow column,
    sealing the passage by means of annular inflatable seals located around the pipeline in the passage,
    draining the water from said column and an associated cell portion of the base,
    joining the pipeline to the riser pipe while both are in air,
    refilling said column said associated cell portion of the base for ensuring a balance of pressures on either side of the passage;
    breaking the sealing of the passage;
    releasing the pipeline in the passage for permitting relatively free movement of the pipeline in the passage without stress.

2. A method as claimed in claim 1, wherein the pipeline is centered in the passage after insertion therein and prior to sealing thereof by means of inflatable tubes located in the passage.

3. An offshore structure comprising a hollow base and at least one substantially vertical hollow column extending from the base to support a work platform above water level, the base including a passage extending from the interior to the exterior thereof, through which a pipeline enters from the exterior and is connected to a riser pipe extending along said hollow column and connected to said work platform, reusable sealing means located within the passage such that said hollow column and associated part of the base in which the pipeline and riser pipe are connected may be drained of water, and sealing means being released once the pipeline and the riser pipe are connected to each other and wherein the passage is of such dimensions that once said reusable sealing means is released, the pipeline is permitted substantially free movement within the passage by the flexibility of the riser pipe.

4. An offshore structure as claimed in claim 3, wherein guide means for the pipeline are provided near each end of the passage.

5. An offshore structure as claimed in claim 4, wherein a plurality of inflatable tubes are provided in the passage between the guide means and which may be inflated after insertion of the pipeline to center the pipeline in the passage.

6. An offshore structure as claimed in claim 5 wherein the tubes extend axially along the passage and are located by means of axially extending guide rails.

7. An offshore structure as claimed in claim 2, wherein said reusable sealing means comprise two or more axially spaced inflatable annular seals, each of said seals being separated from an adjacent one by means of an annular ring.

8. An offshore structure as claimed in claim 7, wherein each annular seal is provided with a pair of axially extending annular flanges each seal being located in an annular seal-retaining slot for maintaining the annular seal in position.

* * * * *